United States Patent
Bretschneider (10) Patent No.: US 11,067,962 B2
(45) Date of Patent: Jul. 20, 2021

(54) ROTATION OF WORKPIECES ON A MACHINE TOOL

(71) Applicant: Siemens Aktiengesellschaft, Munich (DE)

(72) Inventor: Jochen Bretschneider, Owingen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/760,375

(22) PCT Filed: Oct. 12, 2018

(86) PCT No.: PCT/EP2018/077838
§ 371 (c)(1),
(2) Date: Apr. 29, 2020

(87) PCT Pub. No.: WO2019/086227
PCT Pub. Date: May 9, 2019

(65) Prior Publication Data
US 2020/0356067 A1   Nov. 12, 2020

(30) Foreign Application Priority Data
Nov. 3, 2017   (EP) ..................................... 17199915

(51) Int. Cl.
*G05B 19/402*   (2006.01)
(52) U.S. Cl.
CPC .. *G05B 19/402* (2013.01); *G05B 2219/42019* (2013.01)
(58) Field of Classification Search
CPC ........ G05B 19/402; G05B 2219/42019; B23Q 1/26; B23Q 15/12
See application file for complete search history.

(56) References Cited

U.S. PATENT DOCUMENTS

| 2004/0244546 A1 | 12/2004 | Mitsuzono et al. |
| 2007/0247589 A1 | 10/2007 | Schorcht et al. |
| 2015/0323923 A1* | 11/2015 | Takabe .................. G05B 19/19 700/186 |

FOREIGN PATENT DOCUMENTS

| CN | 1221174 A | 6/1999 |
| DE | 19616526 A1 | 11/1997 |

(Continued)

OTHER PUBLICATIONS

PCT International Search Report and Written Opinion of International Searching Authority dated Jun. 2, 2019 corresponding to PCT International Application No. PCT/EP2018/077838 filed Oct. 12, 2018.

*Primary Examiner* — Christopher E. Everett
(74) *Attorney, Agent, or Firm* — Henry M. Feiereisen LLC (57) ABSTRACT

A machine tool has a tool and a workpiece clamped into a workpiece holder on a workpiece table and a tool. The workpiece table is rotatable about a rotation axis in a position-controlled manner by a plurality of complete revolutions, and the tool is movable at least parallel to the rotation axis in a position-controlled manner. While the workpiece table is rotated, the tool is placed at least temporarily against the workpiece on a side substantially facing away from the workpiece table, machines the workpiece, and the tool is at a distance being at least equal to a predefined minimum distance from the rotation axis. The first workpiece holder is displaced in a direction that has a component towards or away from the rotation axis on the workpiece table in a position-controlled manner during the machining of the first workpiece by the first tool.

16 Claims, 4 Drawing Sheets

(56) References Cited

FOREIGN PATENT DOCUMENTS

EP 2 275 217 A1 1/2011
WO WO 2006/015761 A1 2/2006

* cited by examiner

ROTATION OF WORKPIECES ON A MACHINE TOOL

CROSS-REFERENCES TO RELATED APPLICATIONS

This application is the U.S. National Stage of International Application No. PCT/EP2018/077838 filed Oct. 12, 2018, which designated the United States and has been published as International Publication No, WO 2019/086227 A1 and which claims the priority of European Patent Application, Serial No. 17199915.4, filed Nov. 3, 2017, pursuant to 35 U.S.C. 119(a)-(d).

BACKGROUND OF THE INVENTION

The present invention is based on an operating method for a machine tool,
- wherein the machine tool has at least one workpiece table, a first workpiece holder that is arranged on the workpiece table, and a first tool,
- wherein the workpiece table may be rotated in a position-controlled manner about an axis of rotation and the first tool may be moved in a position-controlled manner at least parallel to the axis of rotation,
- wherein a first workpiece is clamped into the first workpiece holder,
- wherein the workpiece table is rotated about the axis of rotation by a plurality of complete rotations,
- wherein, while the workpiece table is rotating about the axis of rotation, the first tool is placed at least temporarily against the first workpiece on a side that substantially faces away from the workpiece table with the result that the first tool machines the first workpiece in a metal-cutting manner,
- wherein, during the entire process of machining the first workpiece in a metal-cutting manner by the first tool, the first tool is located at a first distance from the axis of rotation, said distance always being at least as large as a predefined first minimum distance,
- wherein the first workpiece holder is displaced on the workpiece table in a position-controlled manner during the process of machining the first workpiece in a metal-cutting manner by the first tool.

The present invention is furthermore based on a computer program that comprises a machine code that may be processed directly by a control unit of a machine tool, wherein the processing of the machine code by the control unit causes the control unit to operate a machine tool, which has at least one workpiece table that may be rotated in a position-controlled manner about an axis of rotation, a first workpiece holder that is arranged on the workpiece table, and a first tool that may be moved in a position-controlled manner at least parallel to the axis of rotation, in such a manner
- that the workpiece table is rotated about the axis of rotation by a plurality of complete rotations,
- that, while the workpiece table is rotating about the axis of rotation, the first tool is placed at least temporarily against the first workpiece on a side that substantially faces away from the workpiece table, said first workpiece being clamped into the first workpiece holder, with the result that the first tool machines the first workpiece in a metal-cutting manner,
- that, during the entire process of machining the first workpiece in a metal cutting manner by the first tool, the first tool is located at a first distance from the axis of rotation, said distance always being at least as large as a predefined first minimum distance.

The present invention is furthermore based on a control unit of a machine tool, wherein the control unit is programmed with a computer program with the result that the machine tool operates according to the above-mentioned procedures.

The present invention is furthermore based on a machine tool,
- wherein the machine tool has at least one workpiece table, a first workpiece holder that is arranged on the workpiece table, and a first tool,
- wherein the workpiece table may be rotated in a position-controlled manner about an axis of rotation by a plurality of complete rotations and the first tool may be moved in a position-controlled manner at least parallel to the axis of rotation,
- wherein the machine tool has a control unit of this type.

The mentioned subject matters are known from US 2004/0 244 546 A1.

Similar subject matters are known from WO 2006/015 761 A1 and from EP 2 275 217 A1, wherein in the case of these documents, however, the first workpiece holder is not displaced on the workpiece table while the first workpiece is being machined by the first tool and in addition EP 2 275 217 A1 also does not mention that the workpiece table rotates in a position-controlled manner.

During the process of machining metal workpieces, the workpiece is generally clamped on a workpiece table into a workpiece holder and then machined by way of metal-cutting tools. So as to machine the workpiece, the tool is moved in a position-controlled manner relative to the workpiece. The metal-cutting machining process may be by way of example a milling process. This type of machining process is particularly flexible, Although the process of machining by way of milling is very flexible, it does however require considerable time in the case of some workpieces. In many cases this is unavoidable. In other cases, the machining time may be considerably shortened if the workpiece is not machined by way of milling but rather by way of turning. In the case of a turning process, the workpiece is rotated about an axis and the tool is placed against the workpiece. As a consequence, rotationally symmetrical parts are generally produced.

Generally, the tool is placed against the workpiece on a lathe tool from the radial direction. In more recent times, the machining process is applied by way of a turning process but also on conventional machine tools. In this case, the tool is used so as to machine the side of the workpiece that faces away from the workpiece table, in other words so as to machine the end face of the workpiece (so-called end-face machining). For this purpose, the workpiece is clamped into a workpiece holder on the workpiece table. The workpiece table—that is generally embodied as a round table—is rotated quickly. While the workpiece table is rotating about the axis of rotation, the first tool is placed parallel to the axis of rotation against the workpiece with the result that the first tool machines the first workpiece in a metal-cutting manner. As a consequence, it is possible to considerably increase productivity in comparison to a conventional milling process. This applies more particularly if a flat profile is to be machined.

The object of the present invention is to create possibilities by means of which machining processes of this type may be optimized in such a manner that they combine maximal productivity and a technically optimal machining process with one another.

SUMMARY OF THE INVENTION

According to one aspect of the invention, the object is achieved by way of an operating method, wherein the machine tool has at least one workpiece table, a first workpiece holder that is arranged on the workpiece table, and a first tool, wherein the workpiece table may be rotated in a position-controlled manner about an axis or rotation and the first tool may be moved in a position-controlled manner at least parallel to the axis of rotation, wherein a first workpiece is clamped into the first workpiece holder, wherein the workpiece table is rotated about the axis of rotation by a plurality of complete rotations, wherein, while the workpiece table is rotating about the axis of rotation, the first tool is placed at least temporarily against the first workpiece on a side that substantially faces away from the workpiece table with the result that the first tool (5) machines the first workpiece in a metal-cutting manner, wherein, during the entire process of machining the first workpiece in a metal-cutting manner by the first tool, the first tool is located at a first distance from the axis of rotation, said distance being at least as large as a predefined first minimum distance, wherein the first workpiece holder is displaced on the workpiece table in a position-controlled manner during the process of machining the first workpiece in a metal-cutting manner by the first tool, wherein a direction in which the displacement is performed has a component that moves toward the axis of rotation or away from said axis of rotation.

Advantageous embodiments of the operating method are the subject matter of the dependent claims.

In accordance with the invention, an operating method of the type mentioned in the introduction is configured in such a manner that a direction in which the displacement is performed has a component that moves toward the axis of rotation or away from said axis of rotation.

As a consequence, it is possible that despite the limitation that practically always arises for the rotational speed of the workpiece table, it is always possible to maintain the speed of the first tool relative to the workpiece above a minimal value, wherein the minimal value is determined by way of the product of the first minimum distance and the maximal rotational speed of the workpiece table. As a consequence, it is possible on the one hand to ensure a technically optimal machining process. Furthermore, by way of ensuring a minimum speed, it is possible to increase productivity.

The desired target—to maintain the first minimum distance—may be achieved in this case by virtue of the fact that the first workpiece holder is displaced—and and with the displacement of said first workpiece holder the first workpiece is also displaced—on the workpiece table toward the axis of rotation or away from said axis of rotation. As a consequence, regions of the first workpiece, which are initially located in close proximity of the axis of rotation (in other words their distance is initially less than the first minimum distance) may be displaced radially outward with the result that after being displaced radially outward their distance from the axis of rotation is at least as large as the predetermined first minimum distance.

If, while the first workpiece is being machined in a metal-cutting manner by the first tool, the first workpiece holder is displaced on the workpiece table in a position-controlled manner toward the axis of rotation or away from said axis of rotation, it is possible to position the tool viewed with respect to the axis of rotation (in other words in the radial direction). Depending upon the extent to which it is possible to displace the first workpiece holder toward the axis of rotation or away from said axis of rotation, this may even be absolutely necessary. In the case of a sufficiently large possible displacement of the first workpiece holder, it is however alternatively possible that, during the entire process of machining the first workpiece in a metal-cutting manner by the first tool, the first tool is always held in the same position viewed radially with respect to the axis of rotation. This technique renders it possible in particular to operate the workpiece table at a constant rotational speed and as a consequence also to maintain the relative speed between the workpiece and the tool constant. As a consequence, the distance between the first tool and the axis of rotation and the rotational speed of the workpiece table may be coordinated with one another in such a simple manner that the first tool is able to machine the first workpiece in an optimal manner from the technological point of view.

In a particularly preferred embodiment of the present invention it is provided that:
  in addition a second workpiece is clamped into a second workpiece holder that is arranged on the workpiece table and
  that, while the workpiece table is rotating about the axis of rotation, the first tool is also placed at least temporarily against the second workpiece on a side that substantially faces away from the workpiece table with the result that the first tool also machines the second workpiece in a metal-cutting manner.

It is possible by virtue of this technique to realize different advantages. Initially, it is possible with regard to the work tool table to avoid or at least considerably reduce imbalances that would automatically occur in the case of only one individual workpiece that is arranged in an eccentric manner. Furthermore, it is possible with regard to a single rotation of the workpiece table to minimize the amount of times during which the first tool is not machining a workpiece. Productivity is therefore increased. In many cases, as a consequence in addition better use of the workpiece table is also realized. Because in this case the workpieces are arranged at a relatively large distance from the axis of rotation, this embodiment also often facilitates a high speed being achieved between the first tool and the workpieces by means of relatively low rotational speeds of the workpiece table.

In the simplest case, the first workpiece and the second workpiece are similar to one another and furthermore the first workpiece and the second workpiece are machined in a similar manner by the first tool. However, this is not absolutely necessary. On the contrary, it is possible as an alternative that the first workpiece and the second workpiece are machined by the first tool in a different manner from one another.

In a further likewise particularly preferred embodiment of the present invention, it is provided,
  that the machine tool has in addition a second tool,
  that the second tool may be moved in a position-controlled manner at least parallel to the axis of rotation,
  that, while the workpiece table is rotating about the axis of rotation, the second tool is placed at least temporarily against the first workpiece on a side that substantially faces away from the workpiece table with the result that the second tool machines the first workpiece in a metal-cutting manner, and
  that, during the entire process of machining the first workpiece in a metal-cutting manner by the second tool, the second tool is located at a second distance from the axis of rotation, said distance always being at least as large as a predefined second minimum distance.

It is possible by virtue of this technique to increase productivity in particular in a simple manner.

In the simplest case, the first tool and the second tool perform similar machining processes on the first workpiece. However, this is not absolutely necessary. On the contrary, it is possible as an alternative that the first tool and the second tool perform different machining processes on the first workpiece. By way of example, the first tool may perform a machining process that is similar to roughing the workpiece and the second tool may perform a machining process that is similar to smoothing the workpiece.

It is particularly advantageous to use multiple tools to perform the machining process combined with machining multiple workpieces. As a consequence, it is possible in particular to avoid one-sided loadings on the workpiece table since the forces with which the tools are pressed against the workpieces, may produce lever torques that balance each other out with respect to the axis of rotation of the workpiece table.

According to another aspect of the invention, the object is furthermore achieved by a computer program that includes the machine code that may be processed directly by a control unit of a machine tool, wherein the processing of the machine code by the control unit causes the control unit to operate a machine tool, which has at least one workpiece table that may be rotated in a position-controlled manner about an axis of rotation, a first workpiece holder that is arranged on the workpiece table, and a first tool that may be moved in a position-controlled manner at least parallel to the axis of rotation, in such a manner that the workpiece table is rotated about the axis of rotation by a plurality of complete rotations, that, while the workpiece table is rotating about the axis of rotation, the first tool is placed at least temporarily against a first workpiece on a side that substantially faces away from the workpiece table, said first workpiece being clamped into the first workpiece holder, with the result that the first tool machines the first workpiece in a metal-cutting manner, that, during the entire process of machining the first workpiece by the first tool, the first tool is located at the first distance from the axis of rotation, said distance being at least as large as predefined first minimum distance, and that, during the process of machining the first workpiece in a metal-cutting manner by the first tool, the first workpiece holder is displaced on the workpiece table in a position-controlled manner toward the axis of rotation or away from said axis of rotation.

An advantageous embodiment of the computer program is the subject matter of the dependent claim.

In accordance with the invention, the processing of the machine code by the control unit causes the control unit to operate the machine tool in such a manner that, during the process of machining the first workpiece in a metal-cutting manner by the first tool, the first workpiece holder is displaced on the workpiece table in a position-controlled manner toward the axis of rotation or away from said axis of rotation.

In other words, the processing of the machine code by the control unit essentially causes the control unit during the operation to operate the machine tool in accordance with an operating method in accordance with the invention.

Furthermore, it is preferred that the processing of the machine code by the control unit causes the control unit to operate the machine tool in such a manner that during the process of machining the first workpiece in a metal-cutting manner by the first tool the first tool is always held in the same position viewed radially with respect to the axis of rotation or the first tool is moved in a position-controlled manner in the radial direction with respect to the axis of rotation, while the workpiece table is rotating about the axis of rotation, the first tool is placed at least temporarily against a second workpiece on a side that substantially faces away from the workpiece table, said second workpiece being clamped into a second workpiece holder that is arranged on the workpiece table, with the result that the first tool also machines the second workpiece in a metal-cutting manner, and/or while the workpiece table is rotating about the axis of rotation, a second tool that may be moved in a position-controlled manner parallel to the axis of rotation is placed at least temporarily against the first workpiece on the side that substantially faces away from the workpiece table, with the result that the second tool machines the first workpiece in a metal-cutting manner, wherein, during the entire process of machining the first workpiece in a metal-cutting manner by way of the second tool, the second tool is located at a second distance from the axis of rotation, said distance always being at least as large as a predefined second minimum distance.

The advantageous embodiments are therefore essentially that the control unit during the operation operates the machine tool in accordance with one of the advantageous embodiments of the operating method in accordance with the invention.

Furthermore, the object is achieved according to yet another aspect of the invention by a control unit which is programmed with a computer program in accordance with the invention with the result that the machine tool operates according to the measures in accordance with the invention.

According to still another aspect of the invention, the object is furthermore achieved by a machine tool, wherein the first workpiece holder may be displaced on the workpiece table in a position-controlled manner toward the axis of rotation or away from said axis of rotation by means of a position-controlled drive and furthermore the control unit of the machine tool is embodied in accordance with the invention.

BRIEF DESCRIPTION OF THE DRAWING

The above described characteristics, features and advantages of this invention and the manner in which they are realized become clearer and more easily understandable in conjunction with the following description of the exemplary embodiments that are further explained with reference to the drawings. The drawings show in a schematic illustration:

FIG. 1 a machine tool,
FIG. 2 a flow diagram,
FIG. 3 a plan view of a workpiece table,
FIG. 4 a plan view of a workpiece table including a workpiece,
FIG. 5 a plan view of a workpiece table including multiple workpieces,
FIG. 6 a plan view of a workpiece table including multiple workpieces, and
FIG. 7 a side view of a workpiece table.

DETAILED DESCRIPTION OF PREFERRED EMBODIMENTS

Figure 1:
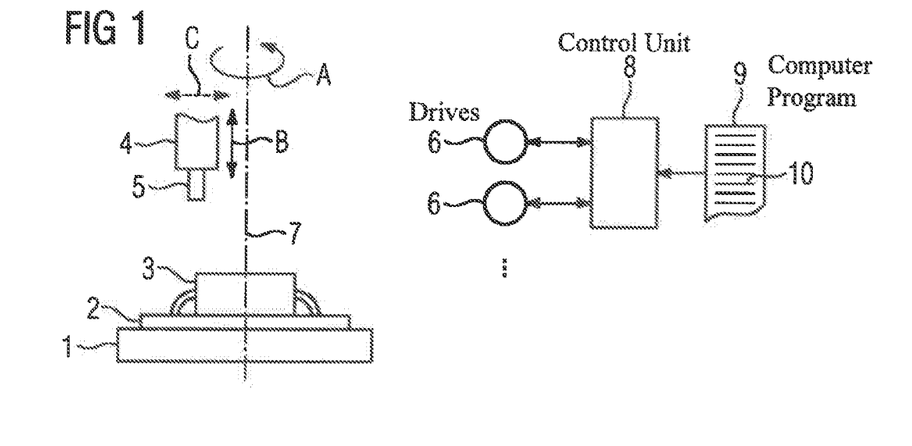

In accordance with FIG. 1, a machine tool has a workpiece table 1. A workpiece holder 2 is arranged on the workpiece table 1. The workpiece holder 2 is described below as the first workpiece holder since in the case of some embodiments of the present invention multiple workpiece holders are provided. A workpiece 3 may be clamped into the first workpiece holder 2. The workpiece 3 is described below as the first workpiece.

The machine tool has furthermore a tool holder 4. The tool holder 4 is described below as the first tool holder since in the case of some embodiments of the present invention multiple tool holders are provided. A tool 5 may be clamped into the first tool holder 4. The tool 5 is described below as the first tool. Within the scope of the present invention, the first tool 5 is embodied as a turning tool (lathe tool).

The machine tool has furthermore a number of position-controlled drives 6.

The workpiece table 1 may be rotated about an axis of rotation 7 by means of one of the drives 6. The extent to which the workpiece table 1 rotates about the axis of rotation 7 is not limited in this case to a determined angle range. On the contrary, it is possible in the case of an appropriate control of the associated position-controlled drive 6 to rotate the workpiece table 1 any number of times completely about the axis of rotation 7. The expression "to rotate completely about the axis of rotation 7" does not mean in this case that the angle of rotation about which the workpiece table 1 is rotated is equal to a whole multiple of a full rotation. On the contrary, the expression means that the workpiece table 1 is not only rotated about a part of a full rotation but rather is rotated over a considerably greater angle of rotation. On account of the associated drive 6 being embodied as a position-controlled drive, the workpiece table 1 is also rotated in a position-controlled manner. An arrow A in FIG. 1 indicates that the workpiece table 1 may be rotated about the axis of rotation 7.

Insofar as the terms "axial", "radial" and "tangential" are used below, said terms are always in relation to the axis of rotation 7. "Axial" is a direction parallel to the axis of rotation 7. "Radial" is a direction orthogonal to the axis of rotation 7 directly toward the axis of rotation 7 or away from said axis of rotation. "Tangential" is a direction that is oriented both orthogonal to the axial direction and also orthogonal to the radial direction. "Tangential" is therefore a direction that in the case of a constant axial position and a constant radial distance is oriented in a circular manner about the axis of rotation 7.

The first tool 5 may be moved in a position-controlled manner in the axial direction by means of a further one of the position-controlled drives 6. This is indicated in FIG. 1 by a double arrow B. In some embodiments of the present invention, it is furthermore possible for the first tool 5 to also move in a position-controlled manner in the radial direction. This is indicated in FIG. 1 by way of a double arrow C. However, it is only necessary in some embodiments of the present invention for said tool to be able to move in the radial direction. The double arrow C is therefore only illustrated in FIG. 1 by a broken line.

The operation of the machine tool and consequently in particular the control of the drives 6 is performed by way of a control unit 8 of the machine tool. The control unit 8 is programmed with a computer program 9. The computer program 9 comprises a machine code 10 that may be processed directly by the control unit 8. The programming of the control unit 8 with the computer program 9, resulting in other words in the control unit 8 processing the machine code 10, causes the control unit 8 to operate the machine tool in accordance with an operating method that is further explained below. It is hereby possible in the individual case that individual procedures are not controlled by the control unit 8. If this is the case, appropriate reference is made thereto. In the absence of such a reference, the procedure is controlled by the control unit 8.

Figure 2:
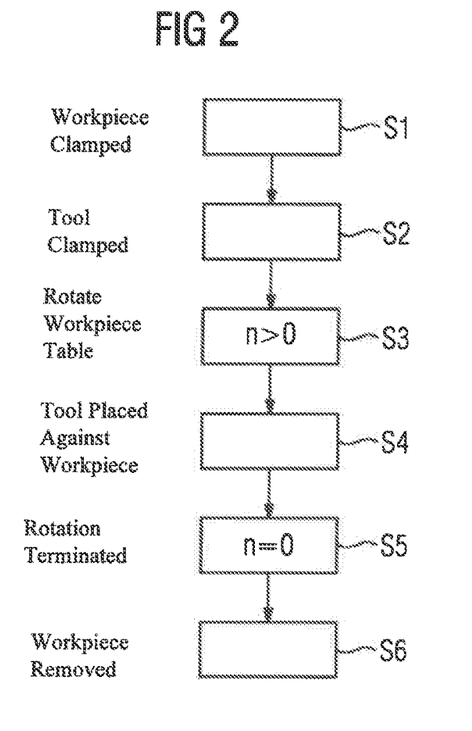

Within the scope of the operating method in accordance with the invention, the first workpiece 3 is clamped into the first workpiece holder 2 in accordance with FIG. 2 initially in a step S1. Subsequently in a step S2, the first tool 5 is clamped into the first tool holder 4. Steps S1 and S2 may be controlled by the control unit 8. However, it is alternatively possible to perform these steps S1 and/or S2 in a different manner, by way of example manually or under the control of another control unit that is not illustrated in the figure.

Subsequently in a step S3, the workpiece table 1 is set into rotation with the result that said workpiece table rotates at a determined rotational speed n about the axis of rotation 7. This rotational movement is maintained within the scope of the step S4. It is in fact conceivable that the rotational speed n is varied within the scope of the step S4. The rotational movement of the workpiece table 1 is however maintained as such. The number of rotations of the workpiece table 1 is of secondary importance within the scope of the present invention. However, it may be important to be able to detect the respective rotational position of the workpiece table 1 during the individual rotations. This is the case since the drive 6 by means of which the workpiece table 1 is rotated is a position-controlled drive 6.

In the step S4, the first tool 5 is placed against the first workpiece 3. Said first tool is placed on a side of the first workpiece 3 that faces away from the workpiece table 1 according to the illustration in FIG. 1. The first workpiece 3 is therefore located viewed in the axial direction between the workpiece table 1 and the first tool 5. A procedure of so-called end-face machining is consequently performed on the first workpiece 3. In so doing, it is irrelevant whether the machining is performed completely in the axial direction or at an angle with respect to the axis of rotation 7.

The first tool 6 machines the first workpiece 1 in a metal-cutting manner. The type of machining process is a turning process. The turning process is a machining process in which the required speed of the cutting edge of the tool 5 for the machining process relative to the first workpiece 3 is produced in essence by way of rotating the workpiece table 1 and thus by way of example rotating the first workpiece 3. This speed is oriented in the tangential direction. In contrast, orthogonal to this movement, in other words in the axial direction and/or radial direction, only a relatively slow movement of the first tool 5 occurs relative to the first workpiece 3. A turning process is in contrast to a milling process in which the first tool 5 as a whole moves only quite slowly relative to the first workpiece 3 in all three spatial directions and the required speed of the cutting edges of the first tool 5 is in essence produced by way of rapidly rotating the first tool 5 about an axis of rotation of the first tool 5.

It is possible that the axial positioning of the first tool 5 relative to the first workpiece 3 during the rotation of the workpiece table 1 is maintained or it changes only relatively slowly. Alternatively, it is possible to perform such changes relatively quickly. The term "quickly" refers in this connection not to the comparison with the speed at which the first workpiece 3 moves relative to the first tool 5. With regard to this speed, the change of the axial positioning of the first tool 5 is always relatively slow. The term "quickly" relates in fact to an individual rotation of the workpiece table 1. In the case of a slow axial positioning, either the direction of the axial positioning of the first tool 5 insofar as the axial positioning is changed at all during an individual rotation of the workpiece table 1 is uniformly the same or maximal a single reverse orientation is performed. In the case of a quick axial positioning, a reverse orientation is performed more than once during a single rotation of the workpiece table 1.

Figure 3:
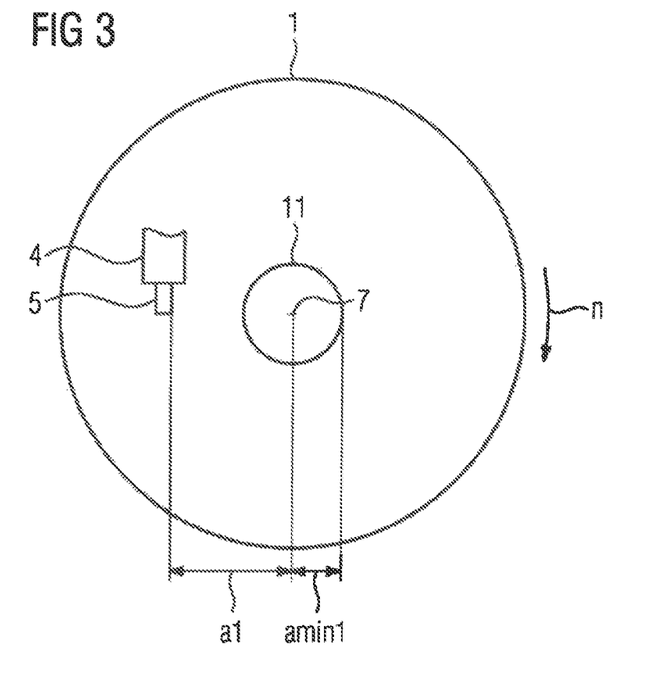

Within the scope of the present invention, it is of secondary importance which of these two techniques is employed. On the contrary, it is decisive that, as shown in the illustration in FIG. 3, during the entire process of machining the workpiece in a metal-cutting manner by the first tool 5, the first tool 5 and consequently a first region of influence in which the first tool 5 machines the first workpiece 3 are located at a first distance a1 from the axis of rotation 7, said distance always being at least as large as a predefined first minimum distance. In other words, a circle the radius of which is equal to the predetermined first minimum distance amin1 represents a prohibited zone 11 within which the first tool 5 may not machine the first workpiece 3. The first minimum distance amin1 is suitably selected. In each case, said minimum distance is greater than 0. By way of example, it may be 5 mm, 10 mm, 20 mm or any other—in particular greater—values.

In order to be able to maintain this condition and yet to be able to perform the desired machining of the first workpiece 3, different techniques are possible.

Figure 4:
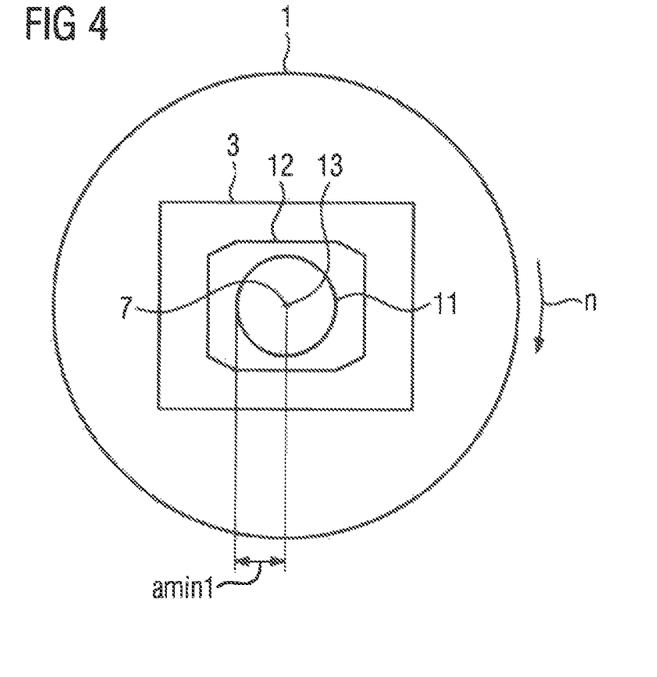

In the most favorable cases, it is possible to clamp the first workpiece 3 essentially centrally in the first workpiece holder 2. This technique is possible if the first workpiece as shown in the illustration in FIG. 4 has a first workpiece region 12 in which the first tool 5 is not to perform any machining. If the first workpiece region 12 is sufficiently large, it is possible in this case to clamp the first workpiece 3 into the first workpiece holder 2 in such a manner that the first workpiece region 12 has a site 13 that is located on the axis of rotation 7. However, it may still be possible to machine the first workpiece 3 by means of the first tool 5 without the distance falling below the first minimum distance amin1. In particular, this is possible if the site 13 is at a distance from the edges of the first workpiece region 12 in each case by at least the first minimum distance amin1. In this case, it is possible to perform the machining process although during the entire machining process by the first tool 5 the first workpiece 3 is always held immobile at the same position of the workpiece table 1. This embodiment is as such not the subject matter of the present invention. An example of a workpiece of this type may be by way of example a flat or slightly curved housing part that has a sufficiently large cut-out at an appropriate site. One example of this type of housing part is a housing part of a mobile telephone, the associated cut-out being the cut-out for a camera optic of the mobile telephone. The technological window for the speed at which the first workpiece 3 moves away under the first tool 5 may be maintained by way of adapting the rotational speed n of the workpiece table 1 (to be more precise: by adapting the speed at which the desired angle value of the workpiece table 1 is changed) to the instantaneous distance a1 of the first tool 5 from the axis of rotation 7.

Figure 5:
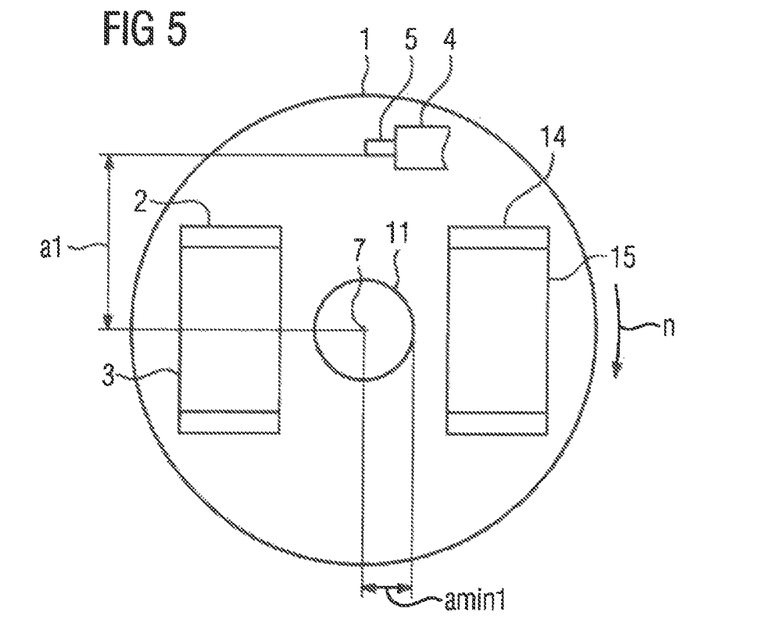
Figure 6:
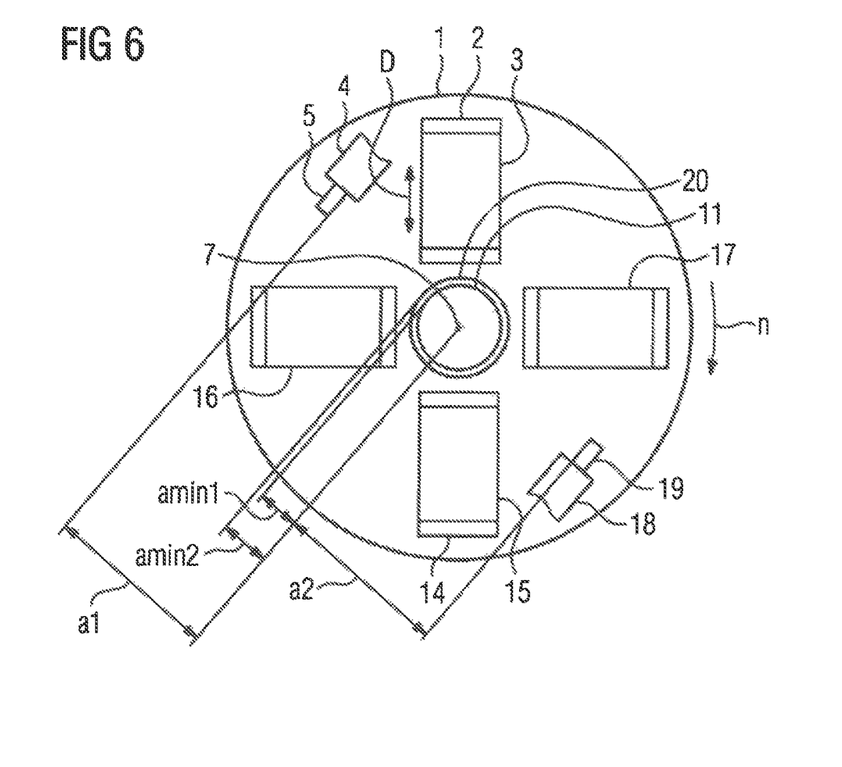

Alternatively, it is possible as shown in the illustration in FIGS. 5 and 6 that the first workpiece 3 is arranged on the workpiece table 1 in such a manner that it is exclusively located at sites that are at a distance from the axis of rotation 7 at least by the first minimum distance amin1. This embodiment represents a clearly eccentric arrangement of the first workpiece 3 relative to the axis of rotation 7. This embodiment is therefore preferably—but not compulsorily—combined with a further embodiment of the present invention. In this further embodiment, a second workpiece holder 14 is arranged on the workpiece table 1 and a second workpiece 15 is clamped into said second workpiece holder. The second workpiece 15 may be clamped into the second workpiece holder 14—in a similar manner to damping the first workpiece 3 into the first workpiece holder 2—as required controlled by the control unit 8 or in any other manner. The technological window for the speed at which the first workpiece 3 moves away under the first tool 5 may also be maintained in this case by adapting the rotational speed n of the workpiece table 1 to the instantaneous distance a1 of the first tool 5 from the axis of rotation 7.

If the second workpiece 15 is clamped into the second workpiece holder 14, the first tool 5 is preferably placed against the second workpiece 15 on a side that faces away from the workpiece table 1 with the result that the first tool 5 also machines the second workpiece 15 in a metal-cutting manner. The above embodiments for machining the first workpiece 3 by the first tool 5 may be used in a similar manner.

In the case of a corresponding eccentric arrangement of the first workpiece 3, it is furthermore possible to hold the first workpiece 3 immobile always at the same position on the workpiece table 1 during the entire process of machining the first workpiece 3 in a metal-cutting manner by the first tool and yet to maintain the first minimum distance amin1 during the entire process of machining by the first tool 5. Similar states apply for the second workpiece 15. Also this embodiment is as such not the subject matter of the present invention.

On the contrary, the subject matter of the present invention is that one of the position-controlled drives 6 acts on the first workpiece holder 2. In particular, it is possible that the first workpiece holder 2 (and with it naturally the first workpiece 3) is displaced in a position-controlled manner during the process of machining by the first tool 5. The direction in which the displacement occurs has at least one component toward the axis of rotation 7 or away from said axis of rotation. It is preferred that the direction as shown in the illustration in FIGS. 6 and 7—cf. there the double arrow D—is actually oriented completely toward the axis of rotation 7 or away from said axis of rotation. It is possible by way of this displacement for regions of the first workpiece 3, which are located within the prohibited zone 11 when the first workpiece 3 is damped into the first workpiece holder 2, to be shifted radially outward by way of appropriately controlling the associated position-controlled drive 6 with the result that after shifting these regions radially outward said regions are located outside the prohibited zone 11. Similar embodiments also apply for the second workpiece 15. The radial displacement of the second workpiece 15 may be coupled to the displacement of the first workpiece 3. Alternatively the second workpiece 15 may be displaced independently.

Figure 7:
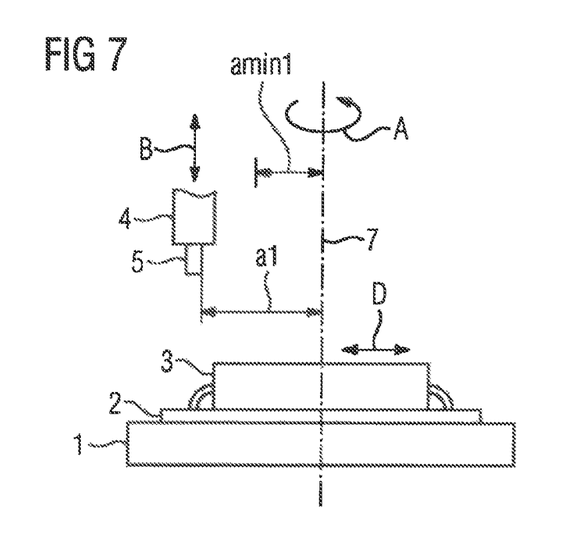

It is possible that the possibility of radially positioning the first workpiece 3 is realized in addition to the possibility of radially positioning the first tool 5. However, in the case of a sufficiently large radial adjusting range of the first workpiece holder 2, it is possible that the first tool 5 is always held at the same position viewed in the radial direction. This is indicated in FIGS. 6 and 7 by virtue of the fact that the double arrow C is not shown in said figures. In this case, the speed at which the first workpiece 3 moves away under the first tool 5 may be maintained by adapting the rotational speed n of the workpiece table 1 to the then constant distance a1 of the first tool 5 from the axis of rotation 7.

After machining the first workpiece 3 (and where appropriate the second workpiece 15 and where appropriate also further workpieces 16, 17), the rotation of the workpiece table 1 is terminated in a step S5 (n=0). In a step S6, the workpieces 3, 15 etc. are subsequently removed from their workpiece holders 2, 14 etc. In a similar manner to clamping the workpieces 3, 15 into the workpiece holders 2, 14, the step S6 may be performed as required controlled by the control unit 8 or in any other manner.

It is possible and generally to be realized that the first workpiece and the second workpiece 3, 15 (and where appropriate also further workpieces 16, 17) are similar to one another and are machined in a similar manner by the first tool 5. This technique renders it possible in some cases in particular to perform the axial positioning of the first tool 5 slowly. However, if a quick axial positioning of the first tool 5 is possible, it is alternatively likewise possible that the first workpiece and the second workpiece 3, 15 (and where appropriate also further workpieces 16, 17) are machined by the first tool 5 in a different manner from one another or by way of example the first workpiece and the second workpiece 3, 15 (and where appropriate also further workpieces 16, 17) are provided with a contour.

In accordance with FIG. 6, the machine tool has furthermore in addition to the first tool holder 4 a second tool holder 18. In this case, a second tool 19 may be clamped into the second tool holder 18 as shown in the illustration in FIG. 6. The second tool 19 may be clamped into the second tool holder 18 in a similar manner to clamping the first tool 5 into the first tool holder 4 as required controlled by the control unit 8 or in any other manner. In this case, the second tool 19—similar to the first tool 5—may be moved in a position-controlled manner at least axially. Where appropriate, said second tool may in addition be moved radially.

The second tool 19 is a lathe tool similar to the first tool 5. In this case, in step S4 the second tool 19 is also placed against the first workpiece 3 on the side that faces away from the workpiece table 1, with the result that the second tool 19 likewise machines the first workpiece 3 in a metal-cutting manner. This machining process is also a turning operation whereby the end face of the first workpiece 3 is machined. Similar embodiments apply—insofar as available—for the second workpiece 15 and where appropriate also for the further workpieces 16, 17.

During the entire process of machining the first workpiece 3 in a metal-cutting manner, the second tool 19 is located at a second distance a2 from the axis of rotation 7, said second distance always being at least as large as a predetermined second minimum amin2. In other words: a circle the radius of which is equal to the predetermined second minimum distance amin2 represents a prohibited zone 20 within which the second tool 19 may not machine the first workpiece 3. Similar embodiments apply insofar as available also for the second workpiece 15 and where appropriate also for the further workpieces 16, 17.

The second minimum distance amin2 is suitably selected. In each case, said second minimum distance is greater than 0. By way of example, it may be 5 mm, 10 mm, 20 mm or any other in particular greater values. The second minimum distance amin2 may have in particular equally the same value as the first minimum distance amin1.

It is possible that the first tool and the second tool 5, 19 perform similar machining processes on the first workpiece 3 (and insofar as available, also on the second workpiece 15 and where appropriate also on further workpieces 16, 17). Alternatively, they may perform machining processes that are different from one another. By way of example, the first tool 5 may perform a rough machining process, the second tool 19 may perform a precision machining process following on from the rough machining process.

To summarize, the present invention consequently relates to the following facts:

A machine tool has at least one workpiece table 1, a first workpiece holder 2 that is arranged on the workpiece table 1, and a first tool 5. The workpiece table 1 may be rotated in a position-controlled manner about an axis of rotation 7 since the first tool 5 may be moved in a position-controlled manner at least parallel to the axis of rotation 7. A first workpiece 3 is clamped into the first workpiece holder 2. The workpiece table 1 is rotated about the axis of rotation 7 by a plurality of complete rotations. While the workpiece table 1 is rotating about the axis of rotation 7, the first tool 5 is placed at least temporarily against the first workpiece 3 on a side that substantially faces away from the workpiece table 1 with the result that the first tool 5 machines the first workpiece 3 in a metal-cutting manner. During the entire process of machining the first workpiece 3 in a metal-cutting manner, the first tool 5 is located at a first distance a1 from the axis of rotation 7, said distance always being at least as large as a predefined first minimum distance amin1. The first workpiece holder 2 is displaced on the workpiece table 1 in a position-controlled manner during the process of machining the first workpiece 3 in a metal-cutting manner by the first tool 5. A direction in which the displacement occurs has a component toward the axis of rotation 7 or away from said axis of rotation.

The present invention has many advantages. On the one hand, productivity is increased. Furthermore, it is possible in a simple manner to optimally adjust the technological operating aspect. In the event of machining multiple workpieces 3, 15, 16, 17 using similar processes, it is furthermore possible within the scope of a program that specifies the machining of the workpieces 3, 15, 16, 17 to only program explicitly the process for machining the first workpiece 3. The control commands for machining the second workpiece 15 and where appropriate for machining further workpieces 16, 17 may be generated automatically by the control unit 8. However, insofar as different machining processes are desired, these must be available separately—be it within a single program or be it within multiple programs. It is also possible that an operator of the control unit 8 or of the machine tool individually specifies which workpieces 3, 15, 16, 17 are to be machined. This similarly applies for machining the workpieces 3, 15, 16, 17 by multiple tools 5, 19.

Although the invention has been further illustrated and described in detail with reference to the preferred exemplary embodiment, the invention is not limited by the disclosed examples and other variations may be derived therefrom by the person skilled in the art without abandoning the extent of the protection of the invention.

The invention claimed is:

1. A method for operating a machine tool, said method comprising:
   arranging a first workpiece holder of the machine tool on a workpiece table of the machine tool;
   clamping a first workpiece into the first workpiece holder;
   rotating the workpiece table in a position controlled manner about an axis of rotation by a plurality of complete rotations;
   moving a first tool of the machine tool in a position controlled manner at least parallel to the axis of rotation;

placing the first tool at least temporarily against the first workpiece on a side of the first workpiece that substantially faces away from the workpiece table and machining the first workpiece in a metal cutting manner with the first tool while the workpiece table is rotating about the axis of rotation;

locating the first tool at a first distance that is at least as large as a predefined first minimum distance away from the axis of rotation during an entire process of the machining of the first workpiece in the metal culling manner by the first tool; and displacing the first workpiece holder on the workpiece table in a direction that has a component that moves toward the axis of rotation or away from the axis of rotation in a position controlled manner during the process of machining the first workpiece in the metal cutting manner by the first tool.

2. The method of claim 1, further comprising holding the first tool in a same position viewed radially with respect to the axis of rotation during the entire process of machining the first workpiece in a metal-cutting manner by the first tool.

3. The method of claim 1, further comprising:
arranging a second workpiece holder on the workpiece table;
damping a second workpiece into the second workpiece holder; and
placing the first tool at least temporarily against the second workpiece on a side that substantially faces away from the workpiece table and also machining the second workpiece in a metal cutting manner with the first tool while the workpiece table is rotating about the axis of rotation.

4. The method of claim 3, wherein the first workpiece and the second workpiece are similar to one another and are machined by the first tool in a similar manner.

5. The method of claim 3, wherein the first workplece and the second workpiece are machined by the first tool in a different manner to one another.

6. The method of the claim 1 further comprising:
moving a second tool of the machine tool in a position controlled manner at least parallel to the axis of rotation;
placing the second tool at least temporarily against the first workpiece on the side of the first workpiece that substantially faces away from the workpiece table and machining the first workpiece in the metal cutting manner with the second tool while the workpiece table is rotating about the axis of rotation; and
locating the second tool at a second distance that is at least as large as a predefined second minimum distance away from the axis of rotation during an entire process of the machining of the first workpiece in the metal cutting manner by the second tool.

7. The method of claim 6, wherein the first tool and the second tool perform similar or different machining processes on the first workpiece.

8. A computer program product for operating a machine tool, said computer program product comprising machine code embodied in a non-transitory computer readable medium, wherein the machine code, when loaded into a control unit of the machine tool and processed directly by the control unit of the machine tool, causes the control unit to perform the steps of:
clamping a first workpiece into a first workplece holder of the machine tool arranged on a workpiece table of the machine tool;
rotating the workpiece table in a position controlled manner about an axis of rotation by a plurality of complete rotations;
moving a first tool of the machine tool in a position controlled manner at least parallel to the axis of rotation;
placing the first tool at least temporarily against the first workpiece on a side of the first workpiece that substantially faces away from the workpiece table and machining the first workpiece in a metal cutting manner with the first tool while the workpiece table is rotating about the axis of rotation;
locating the first tool at a first distance that is at least as large as a predefined first minimum distance away from the axis of rotation during an entire process of the machining of the first workpiece in the metal cutting manner by the first tool; and
displacing the first workpiece holder on the workpiece table toward the axis of rotation or away from the axis of rotation in a position controlled manner during the process of machining the first workpiece in the metal cutting manner by the first tool.

9. The computer program product of claim 8, wherein the machine code causes the control unit to perform the further steps of:
holding the first tool in a same position viewed radially with respect to the axis of rotation or moving the first tool in a position-controlled manner in a radial direction with respect to the axis of rotation during the process of machining the first workpiece in a metal-cutting manner by the first tool;
clamping a second workpiece into a second workpiece holder arranged on the workpiece table;
placing the first tool at least temporarily against the second workpiece on a side that substantially faces away from the workpiece table and also machining the second workpiece in a metal cutting manner with the first tool while the workpiece table is rotating about the axis of rotation.

10. The computer program product of claim 8, wherein the machine code causes the control unit to perform the further steps of:
moving a second tool in a position controlled manner at least parallel to the axis of rotation;
placing the second tool at least temporarily against the first workpiece on the side of the first workpiece that substantially faces away from the workpiece table and machining the first workpiece in the metal cutting manner with the second tool while the workpiece table is rotating about the axis of rotation;
locating the second tool at a second distance that is at least as large as a predefined second minimum distance away from the axis of rotation during an entire process of the machining of the first workpiece in the metal cutting manner by the second tool.

11. A control unit of a machine tool, wherein the control unit is programmed with a computer program comprising machine code embodied in a non-transitory computer readable medium, wherein the machine code, when loaded into the control unit of the machine tool and processed directly by the control unit of the machine tool, causes the control unit to perform the steps of:
clamping a first workpiece into a first workpiece holder of the machine tool arranged on a workpiece table of the machine tool;

rotating the workpiece table in a position controlled manner about an axis of rotation by a plurality of complete rotations;

moving a first tool of the machine tool in a position controlled manner at least parallel to the axis of rotation;

placing the first tool at least temporarily against the first workpiece on a side of the first workpiece that substantially faces away from the workpiece table and machining the first workpiece in a metal cutting manner with the first tool while the workpiece table is rotating about the axis of rotation;

locating the first tool at a first distance that is at least as large as a predefined first minimum distance away from the axis of rotation during an entire process of the machining of the first workpiece in the metal cutting manner by the first tool; and displacing the first workpiece holder on the workpiece table toward the axis of rotation or away from the axis of rotation in a position controlled manner during the process of machining the first workpiece in the metal cutting manner by the first tool.

12. The control unit of claim 11, wherein the control unit is programmed to perform the further steps of:

holding the first tool in a same position viewed radially with respect to the axis of rotation or moving the first tool in a position-controlled manner in a radial direction with respect to the axis of rotation during the process of machining the first workpiece in a metal-cutting manner by the first tool;

clamping a second workpiece into a second workpiece holder arranged on the workpiece table;

placing the first tool at least temporarily against the second workpiece on a side that substantially faces away from the workpiece table and also machining the second workpiece in a metal cutting manner with the first tool while the workpiece table is rotating about the axis of rotation.

13. The control unit of claim 11, wherein the control unit is programmed to perform the further steps of:

moving a second tool in a position controlled manner at least parallel to the axis of rotation;

placing the second tool at least temporarily against the first workpiece on the side of the first workpiece that substantially faces away from the workpiece table and machining the first workpiece in the metal cutting manner with the second tool while the workpiece table is rotating about the axis of rotation;

locating the second tool at a second distance that is at least as large as a predefined second minimum distance away from the axis of rotation during an entire process of the machining of the first workpiece in the metal cutting manner by the second tool.

14. A machine tool, comprising:
a workpiece table;
a first workpiece holder arranged on the workpiece table;
a first tool; and
a control unit of the machine tool, wherein the control unit is programmed with a computer program comprising machine code embodied in a non-transitory computer readable medium, wherein the machine code, when loaded into the control unit of the machine tool and processed directly by the control unit of the machine tool, causes the control unit to perform the steps of;

clamping a first workpiece into the first workpiece holder;

rotating the workpiece table in a position controlled manner about an axis of rotation by a plurality of complete rotations;

moving a first tool of the machine tool in a position controlled manner at least parallel to the axis of rotation;

placing the first tool at least temporarily against the first workpiece on a side of the first workpiece that substantially faces away from the workpiece table and machining the first workpiece in a metal cutting manner with the first tool while the workpiece table is rotating about the axis of rotation;

locating the first tool at a first distance that is at least as large as a predefined first minimum distance away from the axis of rotation during an entire process of the machining of the first workpiece in the metal cutting manner by the first tool; and displacing the first workpiece holder on the workpiece table toward the axis of rotation or away from the axis of rotation in a position controlled manner during the process of machining the first workpiece in the metal cutting manner by the first tool.

15. The machine tool of claim 14, wherein the control unit is programmed to perform the further steps of:

holding the first tool in a same position viewed radially with respect to the axis of rotation or moving the first tool in a position-controlled manner in a radial direction with respect to the axis of rotation during the process of machining the first workpiece in a metal-cutting manner by the first tool;

clamping a second workpiece into a second workpiece holder arranged on the workpiece table;

placing the first tool at least temporarily against the second workpiece on a side that substantially faces away from the workpiece table and also machining the second workpiece in a metal cutting manner with the first tool while the workpiece table is rotating about the axis of rotation.

16. The machine tool of claim 14, wherein the control unit is programmed to perform the further steps of:

moving a second tool in a position controlled manner at least parallel to the axis of rotation;

placing the second tool at least temporarily against the first workpiece on the side of the first workpiece that substantially faces away from the workpiece table and machining the first workpiece in the metal cutting manner with the second tool while the workpiece table is rotating about the axis of rotation;

locating the second tool at a second distance that is at least as large as a predefined second minimum distance away from the axis of rotation during an entire process of the machining of the first workpiece in the metal cutting manner by the second tool.

* * * * *